US006928121B2

(12) United States Patent
MacFarlane Shearer, III et al.

(10) Patent No.: US 6,928,121 B2
(45) Date of Patent: Aug. 9, 2005

(54) DIGITAL TRANSMITTER WITH CONSTRAINED ENVELOPE AND SPECTRAL REGROWTH OVER A PLURALITY OF CARRIERS

(75) Inventors: Daniel D. MacFarlane Shearer, III, Scottsdale, AZ (US); James A. Sills, Scottsdale, AZ (US)

(73) Assignee: Intersil Americas, Inc., Scottsdale, AZ (US)

( * ) Notice: Subject to any disclaimer, the term of this patent is extended or adjusted under 35 U.S.C. 154(b) by 855 days.

(21) Appl. No.: 09/967,419

(22) Filed: Sep. 28, 2001

(65) Prior Publication Data

US 2003/0063683 A1 Apr. 3, 2003

(51) Int. Cl.[7] .............................................. H04L 27/04
(52) U.S. Cl. ...................................... 375/267; 375/295
(58) Field of Search ................................ 375/295, 296, 375/285, 297, 267; 455/80, 88, 101

(56) References Cited

U.S. PATENT DOCUMENTS

| | | | |
|---|---|---|---|
| 4,962,510 A | 10/1990 | McDavid et al. ............. 375/67 |
| 5,049,832 A | 9/1991 | Cavers ....................... 330/149 |
| 5,287,387 A | 2/1994 | Birchler ....................... 375/60 |
| 5,379,322 A | 1/1995 | Kosaka et al. ................ 375/60 |
| 5,381,449 A | 1/1995 | Jasper et al. .................. 375/69 |
| 5,566,164 A | 10/1996 | Ohlson ......................... 370/18 |
| 5,600,676 A | 2/1997 | Ramesh ...................... 375/283 |
| 5,606,578 A | 2/1997 | O'Dea ......................... 375/298 |
| 5,621,762 A | 4/1997 | Miller et al. ................. 375/298 |
| 5,629,961 A | 5/1997 | Kawabata .................... 375/308 |
| 5,638,403 A | 6/1997 | Birchler et al. ............. 375/296 |
| 5,696,794 A | 12/1997 | O'Dea ......................... 375/296 |
| 5,727,026 A | 3/1998 | Beukema .................... 375/296 |
| 5,805,640 A | 9/1998 | O'Dea et al. ............... 375/296 |
| 6,104,761 A | 8/2000 | McCallister et al. ........ 375/296 |
| 6,236,864 B1 | 5/2001 | McGowan et al. |
| 6,366,619 B1 * | 4/2002 | McCallister et al. ........ 375/295 |
| 2002/0101935 A1 | 8/2002 | Wright et al. |
| 2002/0101936 A1 | 8/2002 | Wright et al. |
| 2002/0146994 A1 * | 10/2002 | Marrah et al. ............ 455/276.1 |
| 2003/0026235 A1 * | 2/2003 | Vayanos et al. ............. 370/342 |

OTHER PUBLICATIONS

May & Rohling, Reducing the Peak-to-Average Power Ratio in OFDM Radio Transmission Systems, IEEE Vehicular Technology Conference, 1998.

Monzingo & Amoroso, Supress Spectral Sidelobe Regrowth with Data Signal Predistortion, Applied Microwave & Wireless, pp. 62–70.

* cited by examiner

Primary Examiner—Mohammed Ghayour
Assistant Examiner—Dung X. Nguyen
(74) Attorney, Agent, or Firm—Lowell W. Gresham; Jordan M. Meschkow; Meschkow & Gresham, P.L.C.

(57) ABSTRACT

A constrained-envelope digital communications transmitter (10) places constraints on the envelope of spectrally constrained, digitally modulated communication signals (46) converted into diverse frequency channels (54) and combined into a composite signal (58). The envelope constraints achieve lower peak-to-average power ratio without allowing significant spectral regrowth. The composite signal (58) is applied to a plurality of cascade-coupled constrained-envelope generators (64). Each constrained-envelope generator (64) detects overpeak events (66) and configures corrective impulses (68) for the overpeak events (66). The corrective impulses (68) are distributed to the respective frequency channels (54) in accordance with a predetermined distribution profile (102) and are filtered into allocated shaped pulses (120) that exhibit a constrained spectrum. The allocated shaped pulses (120) are coherently converted into the respective frequency channels (54) and combined with the composite signal (58) to reduce an unwanted signal peak.

29 Claims, 5 Drawing Sheets

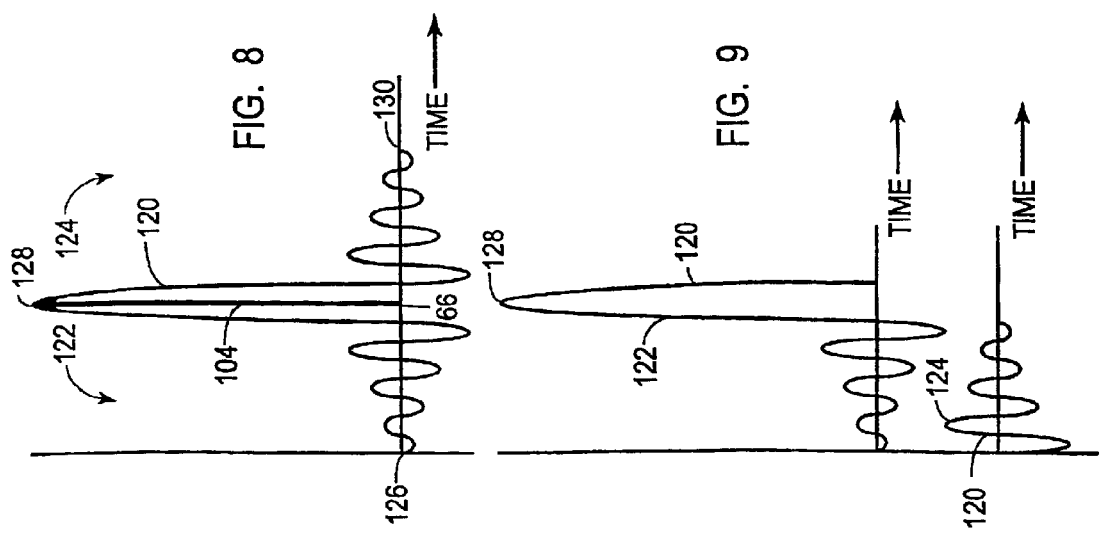
FIG. 8
FIG. 9
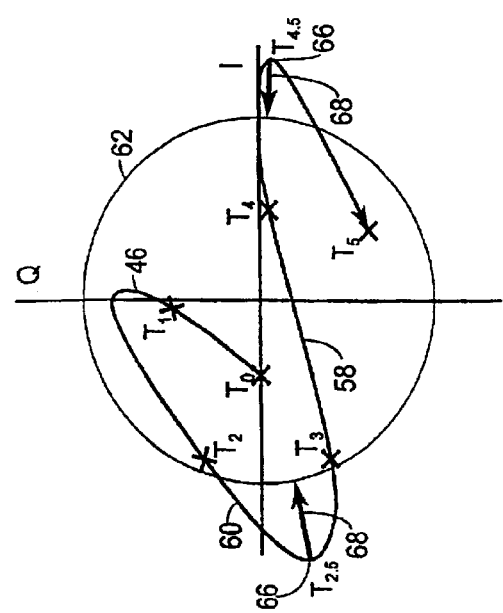
FIG. 4
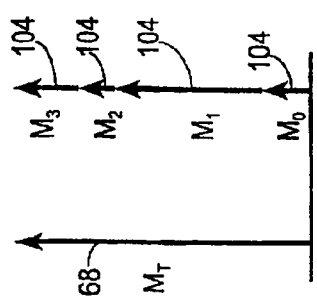
FIG. 6

DIGITAL TRANSMITTER WITH CONSTRAINED ENVELOPE AND SPECTRAL REGROWTH OVER A PLURALITY OF CARRIERS

TECHNICAL FIELD OF THE INVENTION

The present invention relates generally to the field of electronic communications. More specifically, the present invention relates to the field of constrained-envelope digital transmitters.

BACKGROUND OF THE INVENTION

In multi-carrier base stations, hubs, and other digital communication applications, a number of independent communication signal paths are combined together during digital processing. The combined signal is then converted to analog, upconverted, and amplified, all in one RF signal path. By combining signals prior to amplification, an expensive signal combiner can be eliminated. However, the resulting combined signal typically exhibits an increased peak-to-average power ratio.

A communication signal with a high peak-to-average power ratio is undesirable because such a signal requires the use of a high-quality linear amplifier capable of amplifying the greatest signal peaks. As peak-to-average power ratio increases, power amplifier costs likewise increase to accommodate increasingly high and increasingly infrequent peaking events. A high-quality power amplifier is an expensive component, and cost savings obtained by omitting an expensive signal combiner may be lost or diminished due to requirements for high-quality power amplifiers. Power amplifier efficiency, as measured by the ration of input power to output power, decreases as the peak-to-average power ratio increases. Accordingly, a need exists for reducing peak-to-average power ratios in communication signals so that inexpensive power amplifiers may be used and so that power amplifiers are used efficiently.

The problem of reducing peak-to-average power ratios in communication signals is difficult to solve. One technique applies hard limiting to the communication signal to prohibit the otherwise greatest peaking events from occurring in the first place. However, this is a highly undesirable solution because it leads to dramatic spectral regrowth. A moderately better, but still undesirable, technique uses a spectrally inefficient pulse shape in the pulse-shaping filter to limit the greatest signal peaks. But, this technique still suffers from an undesirable amount of spectral regrowth. Other complex techniques require such extensive processing capabilities that they are not practical in connection with high-throughput or continuous, rather than burst, transmission applications, i.e., those greater than 0.5 Mbps, such as the transmission of high-speed video data through a single channel or other data through multiple channels in parallel.

U.S. Pat. No. 6,104,761, entitled "Constrained-Envelope Digital-Communications Transmission System and Method Therefor," by McCallister et al., is incorporated herein by reference. U.S. Pat. No. 6,104,761 teaches a technique to reduce the peak-to-average power ratio of a single channel communication signal without enduring significant amounts of spectral regrowth. Using the technique of U.S. Pat. No. 6,104,761, the greatest peaking events are detected and compensated by adding spectrally efficient corrective pulses to the communication signal.

While the technique of U.S. Pat. No. 6,104,761 produces adequate results for many applications, it does not work on a composite signal in which instantaneous peaking events result from the haphazard combining and canceling of diverse signals occupying different frequency channels.

SUMMARY OF THE INVENTION

It is an advantage of the present invention that an improved digital communications transmitter with constrained envelope and constrained spectral regrowth over a plurality of carriers is provided.

Another advantage is that a constrained-envelope digital communications transmitter and method are provided to generate a signal which, when combined with a composite signal made from a plurality of digitally modulated communication signals, each of which occupies a predetermined bandwidth, reduces peak-to-average power ratio in the composite signal without significantly increasing the bandwidths, either individually or collectively.

Another advantage is that a modulated signal which includes a plurality of diverse frequency channels, or carriers, exhibits a desired bandwidth but undesirably large peak-to-average power ratio is adjusted to lessen the peak-to-average power ratio without significantly increasing bandwidth.

Another advantage of the present invention is that spectrally constrained corrective pulses are added to a multi-carrier modulated signal in a manner that minimizes growth in peak-to-average power ratio caused by the corrective pulses.

Another advantage of the present invention is that, in one embodiment, at least two constrained-envelope generators are coupled in series so that a downstream constrained-envelope generator can compensate for peak-to-average power ratio growth caused by an upstream constrained-envelope generator.

Another advantage of the present invention is that a spectrally desirable corrective shaped pulse is allocated to diverse frequency channels in a manner that fairly distributes the distortion resulting from the corrective shaped pulse over the diverse channels.

These and other advantages are realized in one form by an improved digital communications transmitter with constrained envelope and constrained spectral regrowth over a plurality of carriers. The transmitter includes a combiner for forming a composite signal from a plurality of diverse frequency channels, wherein the diverse frequency channels are configured to convey a plurality of digitally modulated communication signals. A monitoring circuit couples to the combiner and is configured to detect overpeak events by determining when an overpeak-capable signal responsive to the composite signal exceeds a threshold. An impulse generator couples to the monitoring circuit for generating a corrective impulse configured to compensate for an amount by which the overpeak-capable signal is in excess of the threshold. A distribution circuit couples to the impulse generator and is configured to distribute portions of the corrective impulse to the diverse frequency channels.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows a locus of a hypothetical composite signal as it progresses through five unit intervals;

FIG. 6 shows a scalar diagram depicting a hypothetical distribution profile for allocating a corrective impulse to diverse frequency channels;

FIG. 8 shows one exemplary shaped pulse that may be implemented by various filters in the transmitter of FIG. 1; and FIG. 9 shows concurrently-generated leading and trailing portions of the shaped pulse depicted in FIG. 8.

DETAILED DESCRIPTION OF THE PREFERRED EMBODIMENTS

Figure 1:
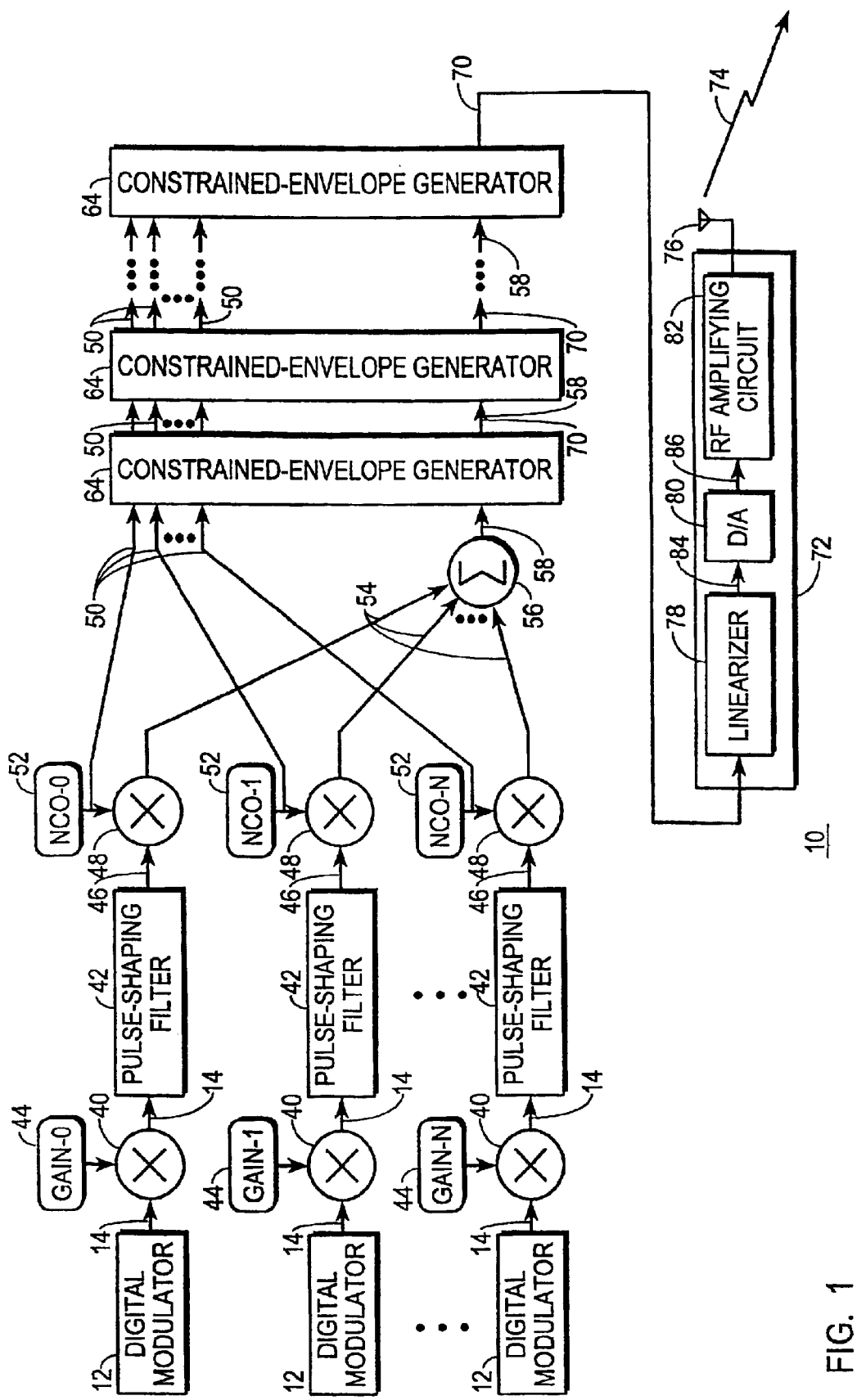
FIG. 1 shows a block diagram of a digital communications transmitter configured in accordance with one embodiment of the present invention.

FIG. 1 shows a block diagram of a digital communications transmitter 10 configured in accordance with one embodiment of the present invention. Transmitter 10 may, but is not required, to be used in a base station or hub which communicates with a number of different mobile, portable, or customer premise devices (not shown). While such mobile, portable, or customer premise devices may need to receive and transmit over no more than one channel at a time in order to communicate with the base station or hub, the base station or hub may need to transmit over a plurality of channels simultaneously to engage in communications with all such mobile, portable, or customer premise devices concurrently. Often, these different channels are frequency division multiple access (FDMA) configured. In other words, different channels are allocated to different frequency ranges, typically adjacent to one another. It is desirable that spectral regrowth be constrained in each frequency channel individually to minimize interference with adjacent channels, and across all frequency channels collectively to meet spectral mask compliance requirements.

Transmitter 10 includes a plurality of digital modulators 12, each of which generates its own digitally modulated communication signal 14. Each digital modulator 12 may be associated with one of a plurality of diverse frequency channels. Each communication signal 14 is spectrally unconstrained. In other words, each exhibits a relatively wide bandwidth. Typically, the bandwidth is so wide that it will not comply with the requirements of a spectral mask with which transmitter 10 must comply or would otherwise cause interference with adjacent frequency channels. Accordingly, further processing is performed on spectrally-unconstrained communication signals 14 to constrain the spectrum of each communication signal. Those skilled in the art will appreciate that in RF, cable, optical, and other types of communications the use of constrained bandwidths is desirable because constrained-bandwidth channels permit the communication of a greater amount of information in a given period of time.

Figure 2:
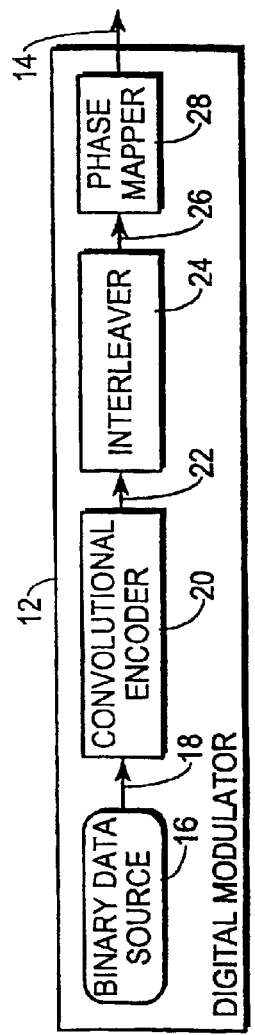
FIG. 2 shows a block diagram of a first exemplary digital modulator usable in the transmitter of FIG. 1.
Figure 3:
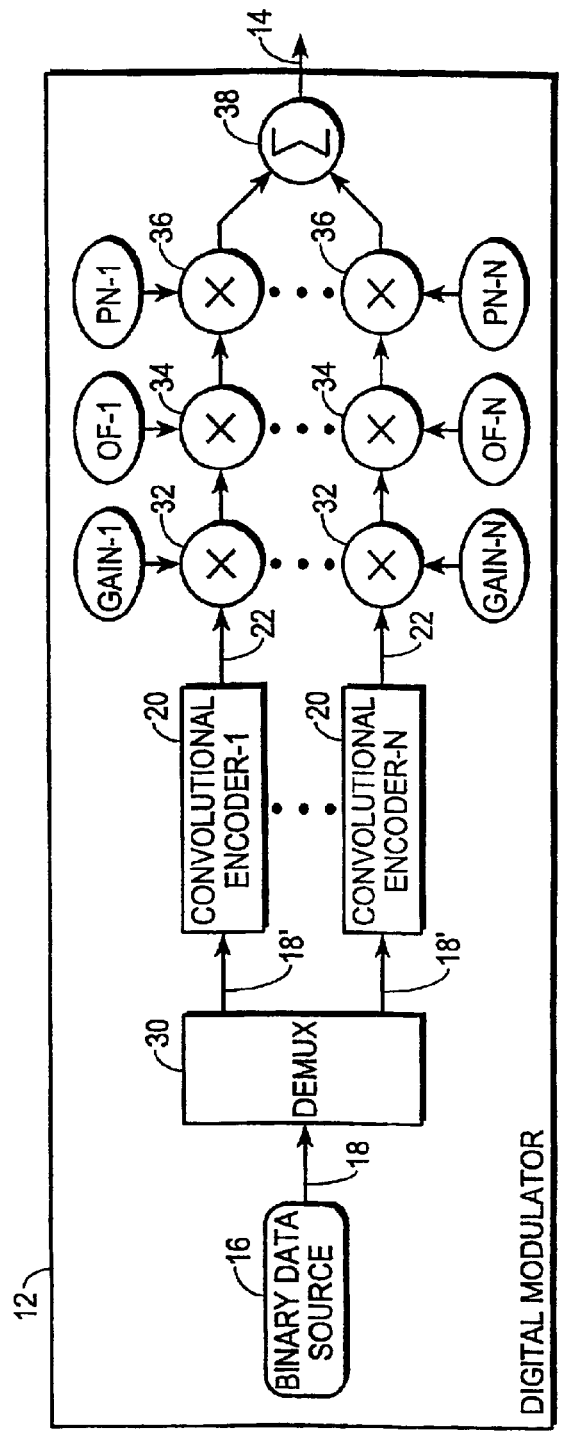
FIG. 3 shows a block diagram of a second exemplary digital modulator usable in the transmitter of FIG. 1.

Any type of digital modulator known to those skilled in the art may be employed as digital modulator 12, and nothing requires all digital modulators 12 in transmitter 10 to be of the same type. FIG. 2 shows a block diagram of a first exemplary digital modulator 12 which may be suitable for APSK (amplitude-phase-shift-keying) modulation, also called QAM (quadrature-amplitude-modulation), or GMSK (Gaussian-minimum-shift-keying) modulation. FIG. 3 shows a block diagram of a second exemplary digital modulator 12 which may be suitable for CDMA (code-division-multiple-access) modulation, also called spread spectrum. However, those skilled in the art will appreciate that other types of digital modulations and digital modulators 12 may be used as well.

Referring to FIG. 2, digital modulator 12 has a binary data source 16 providing a binary input signal stream 18 of to-be-communicated data. Binary data source 16 may be any circuitry, device, or combination thereof producing input signal stream 18. Input signal stream 18 is made up of binary data that may be pre-encoded in any desired manner. That is, input signal stream 18 may be made up of data that has no encoding, concatenated encoding, Reed-Solomon block encoding, or any other form of encoding desired for or required of the communications scheme in use. In addition, input signal stream 18 may include data intended to be communicated to any number of diverse destinations or end users.

In the preferred embodiments, input signal stream 18 is a stream of continuous data (as contrasted with burst data) passing to an input of a convolutional encoder 20, but continuous data is not a requirement of the present invention. Convolutional encoder 20 convolutionally encodes (e.g., Viterbi or turbo encodes) input signal stream 18 into an encoded signal stream 22. However, convolutional encoder 20 may be omitted. An interleaver 24 temporally decorrelates encoded signal stream 22 to produce an interleaved signal stream 26. However, those skilled in the art will appreciate that interleaver 24 is not desired in all embodiments of digital modulator 12, for example when convolutional encoder 20 is omitted. In the preferred embodiments, interleaved signal stream 26 passes to an input of a phase mapper 28. When interleaver 24 is omitted, encoded signal stream 22 is passed directly to the input of phase mapper 28. When both convolutional encoder 20 and interleaver 24 are omitted, binary input signal stream 18 passes directly to the input of phase mapper 28.

Phase mapper 28 maps symbols (i.e., binary data units) present in the communication signal stream presented to it into constellation phase points in a manner well-understood to those skilled in the art. Phase mapper 28 produces spectrally-unconstrained communication signal 14. Those skilled in the art will appreciate that communication signal 14 may be represented by a continuous stream of complex values, in which each complex value may be expressed as having I,Q components in the Cartesian coordinate system, or M,φ components in the polar coordinate system. Typically, one complex value is generated from phase mapper 28 per unit interval.

Referring to FIG. 3, when digital modulator 12 is configured to implement a CDMA communication scheme, binary data source 16 again provides binary input signal stream 18 of to-be-communicated data. In this CDMA embodiment, binary input signal stream 18 includes data to be transmitted through a number of different CDMA code-channels. Thus, one frequency channel may convey any number of CDMA code-channels. Binary input signal stream 18 is provided to a demultiplexer (DEMUX) 30, which parses input signal stream 18 into a quantity N, where N represents the number of independent code-channels provided by modulator 12, of code-channel signal streams 18'. The N code-channel signal streams 18' are respectively routed to N convolutional encoders 20, which generate N encoded signal streams 22. Although not shown, interleavers may be inserted at this point in the signal flow. Each of the N encoded signal streams 22 is routed through respective multiplication stages 32, 34 and 36. Multiplication stage 32 allows the application of scale factors that adjust the relative gain of each code-channel for the purposes of power control. Multiplication stage 34 may be effected by a modulo-2 addition and allows the application of an orthogonal function (OF) (e.g., a Walsh or Hadamard code). Multiplication stage 36 applies various pseudo-noise (PN) codes on a unit chip interval basis to spread the code-channels in a well-known manner. Multiplication stage 36 may also be effected by a modulo-2 addition.

After stages 32, 34 and 36, the N code-channels are summed in an adding stage 38 to form a composite signal stream that represents spectrally-unconstrained communication signal 14.

Referring back to FIG. 1, spectrally-unconstrained communication signals 14 are respectively scaled through a plurality of gain stages 40 and then applied to a plurality of pulse-shaping filters 42. In gain stages 40, respective gains 44, depicted as "GAIN-0" through "GAIN-N" in FIG. 1, are applied to spectrally-unconstrained communication signals 14 to achieve a desired power balance in the various frequency channels to be broadcast from transmitter 10. An ability to balance power among various frequency channels allows a power management scheme to be implemented in transmitter 10. A power management scheme may, for example, allocate more power to frequency channels that will be received by more distant devices and less power to frequency channels that will be received by closer devices, thereby limiting the total power output by transmitter 10 to the minimum amount necessary and reducing general background interference as much as possible.

Each of pulse-shaping filters 42 generates a spectrally-constrained communication signal 46. Each spectrally-constrained communication signal 46 is typically represented as a continuous stream of complex values. Each stream of complex values may have a greater data rate than its respective spectrally-unconstrained communication signal 14. In particular, each spectrally-constrained communication signal 46 may be represented by two or more complex values per unit interval. In the preferred embodiments, pulse-shaping filter 42 is desirably realized as a Nyquist-type filter, such as a Nyquist, root-Nyquist, raised cosine-rolloff, etc., filter for APSK and CDMA modulations or as a Gaussian filter for GMSK modulations. Each filter 42 may be implemented as a finite impulse response (FIR) filter, but this implementation is not a requirement. In some applications, including orthogonal frequency division multiplex (OFDM) systems, also known as multitone modulation (MTM) systems, pulse-shaping filters 42 may be implemented using a transmultiplexer or equivalent circuitry.

Spectrally-constrained communication signals 46 are respectively routed to first inputs of a plurality of mixers 48. Each mixer 48 has a second input adapted to receive its own carrier, configured as a carrier phase stream 50. Each carrier phase stream 50 is generated by its own numerically controlled oscillator 52, depicted as "NCO-0" through "NCO-N" in FIG. 1. Each carrier phase stream 50 conveys samples that define phase values of an oscillation signal, and each carrier phase stream 50 defines a different frequency from the other carrier phase streams 50. Consequently, mixers 48 up-convert digitally modulated communication signals 14, as represented in spectrally-constrained communication signals 46 into diverse frequency channels 54.

Outputs of mixers 48 couple to a combiner 56 which sums diverse frequency channels 54. An output of combiner 56 produces a composite signal 58 that conveys all diverse frequency channels 54. Composite signal 58 is desirably implemented as a complex signal stream that provides samples at a rate sufficiently great to accommodate all diverse frequency channels 54.

FIG. 1 uses ellipsis to indicate that any number of diverse frequency channels 54 may be produced by transmitter 10 and combined in combiner 56. Those skilled in the art will appreciate that as the number of frequency channels 54 increases, so does the data rate for composite signal 58. In a typical implementation, that rate provides a number of complex samples per unit interval greater than or equal to two times the number of frequency channels 54 combined together in combiner 56. Those skilled in the art will appreciate that each of the digitally modulated communication signals 14 conveys a predetermined amount of data per unit interval, that the amount of data may differ between digitally modulated communication signals 14, and that the amount of data may change for each digitally modulated communication signal 14 from time-to-time.

As an illustrative example, which is not to be viewed as imposing a limitation on the invention defined in claims set forth below, four of diverse frequency channels 54 may be produced by mixers 48, with each spectrally-constrained communication signal 46 that feeds a mixer 48 exhibiting a data rate of two complex samples per unit interval, and each using a common unit interval. Furthermore, the common unit interval is of a duration as to define a 5 MHz bandwidth. Oscillators 52 and carrier phase streams 50 may then be configured so that diverse frequency channels 54 occupy diverse frequency ranges of: 0–5 MHz, 5–10 MHz, 10–15 MHz, and 15–20 MHz. In order to accommodate the entire combined 0–20 MHz frequency range, composite signal 58 desirably exhibits a data rate of eight or more complex samples per unit interval. In one embodiment, interpolators (not shown) may be inserted between pulse-shaping filters 42 and respective mixers 48 to achieve the desired data rate (e.g., eight or more complex samples per unit interval). In another embodiment, pulse-shaping filters 42 are configured to generate data at the desired rate.

Each spectrally-unconstrained communication signal 14 typically exhibits a relatively moderate peak-to-average power ratio, but also exhibits abrupt phase changes that can only be reproduced using undesirably large bandwidths. Pulse-shaping filters 42, reduce the abrupt phase changes so that spectrally-constrained communication signals 46 can be reproduced using smaller bandwidths, but increase peak-to-average power ratio as an unwanted consequence. After conversion into diverse frequency channels 54 and summing together in combiner 56, the peak-to-average power ratio is further increased. For the vast majority of instances when samples are added together in combiner 56, some degree of cancellation results, or any increase in magnitude is moderate because complex samples will add somewhat out-of-phase. However, in rare circumstances, samples from diverse frequency channels 54 will add together in-phase resulting in a peak of great magnitude that leads to an undesirably large peak-to-average power ratio parameter.

FIG. 4 shows a locus 60 of a hypothetical composite signal 58 as it progresses through five unit intervals. The five unit intervals have temporal boundaries located between instants in time denoted using the labels $T_0$–$T_5$. Those skilled in the art will appreciate that locus 60 is of a hypothetical nature and need not reflect any actual locus achievable with any particular assortment of digital modulators 12. Rather, locus 60 is illustrated to clarify the concepts and relationships discussed herein.

Locus 60 and the composite signal 58 that locus 60 represents, exhibit occasional peaks, discussed below, which exceed a threshold 62. In order to faithfully reproduce locus 60, a power amplifier located downstream of combiner 56 (FIG. 1) would be required to have a linear range of operation between the minimum and maximum possible magnitudes that locus 62 can exhibit. Such a wide dynamic linear amplification range is undesirable because it typically requires the use of a sophisticated and relatively expensive power amplifier. Accordingly, subsequent processing in transmitter 10 (FIG. 1), discussed below, reduces the maximum possible magnitudes achievable by locus 60, but without significantly requiring locus 60 to undergo abrupt phase changes that would necessitate a wide bandwidth.

Referring to FIGS. 1 and 4, composite signal 58 generated by combiner 56 is applied to a number of series-connected constrained-envelope generators 64. In general, each constrained-envelope generator 64 detects "overpeak" events 66. FIG. 4 depicts two overpeak events 66 that happen to occur around time instants $T_{2.5}$ and $T_{4.5}$. However, nothing requires overpeak events 66 to occur at midpoints between any particular time instants. For purposes of the present discussion, overpeak events are local maximums or peaks in locus 60 which exhibit magnitudes greater than threshold 62. In other words, overpeak events 66 occur when composite signal 58 exhibits peak magnitudes, when viewed over a relatively short temporal interval and the peak magnitudes are greater than, or over, threshold 62.

When an overpeak event 66 is detected, constrained-envelope generator 64 determines the amount by which the peak exceeds threshold 62. This determination produces a complex corrective impulse 68 having both magnitude and phase components, which may likewise be expressed in a Cartesian coordinate system. Corrective impulse 68 is configured in magnitude and phase so that it could be applied to reduce the magnitude of locus 60 to threshold 62 at a subject overpeak event 66. However, corrective impulse 68 is not so applied, at least directly, because the reproduction of corrective impulse 68 would lead to spectral regrowth and would possibly distribute distortion in an undesirable manner between frequency channels 54. Rather, constrained-envelope generator 64 filters and allocates corrective impulse 68 into a plurality of allocated, predetermined-duration shaped pulses that meet spectral constraints and allocates distortion to the diverse frequency channels 54 in a desirable manner. These allocated shaped pulses are then coherently converted to the respective frequency channels and combined with composite signal 58.

In the preferred embodiments, a shaped pulse that meets spectral constraints extends over several unit intervals. Accordingly, each shaped pulse potentially alters the trajectory of locus 60 to some extent over a duration of several unit intervals. In some unusual situations, that trajectory alteration may cause the resulting altered locus 60 to experience an overpeak event 66 where it would not have otherwise experienced one but for the alteration. In other situations, when two or more shaped pulses are applied to composite signal 58 within the duration of the shaped pulses, the influences of the two or more shaped pulses may combine to cause overpeak events 66 where they would not otherwise have occurred.

Each constrained-envelope generator 64 produces a constrained-envelope, constrained-spectrum signal stream 70. Constrained-envelope, constrained-spectrum signal stream 70 represents a locus 60 that has been altered through the application of shaped pulses, as described above. Each signal stream 70 produced by an upstream constrained-envelope generator 64 serves as a composite signal 58 input to the immediately downstream constrained-envelope generator 64. In addition, carrier phase streams 50 used in generating diverse frequency channels 54 are input to each upstream constrained-envelope generator 64, and passed through the constrained-envelope generator 64, albeit in a delayed form, for input to a downstream constrained-envelope generator 64.

The use of more than one constrained-envelope generator 64 allows the downstream constrained-envelope generators 64 to further constrain the communication signal envelope by reducing peaks associated with overpeak events 66 that may be present in the upstream constrained-envelope, constrained-spectrum signal streams 70. As discussed above, such overpeak events 66 may have resulted from the application of shaped pulses in upstream constrained-envelope generators 64.

Those skilled in the art will appreciate that the present invention imposes no requirement on the precise number of constrained-envelope generators 64 that may be cascaded in transmitter 10. A greater number of constrained-envelope generators 64 will result in a greater amount of peak reduction in the composite signal. However, a greater number of constrained-envelope generators 64 will likewise lead to increased communication signal latency and transmitter 10 complexity. Two or three cascaded constrained-envelope generators 64 appear to achieve a beneficial balance between these two competing design considerations in the preferred embodiments. However, improvements may nevertheless be achieved by using only one constrained-envelope generator 64.

Thresholds 62 used by constrained-envelope generators 64 are relatively constant values in the preferred embodiments. The value of a threshold 62 determines the magnitude of a corrective impulse 68 to be distributed across diverse frequency channels 54 in composite signal 58. Greater magnitudes for corrective impulses 68 result from lower thresholds 62 and result in more collective distortion.

The distortion diminishes the ability of a receiving device (not shown) to easily extract the data being communicated. However, in a typical application the amount of distortion applied to composite signal 58 is small and easily compensated for by coding gain, modulation order, and by increasing power levels to achieve a marginally higher signal-to-noise ratio. In a typical application, the reduction in peak power requirements of a power amplifier is far outweighed by the marginal increase in power amplifier requirements needed to compensate for introduced distortion, holding coding gain and modulation order constant. Nevertheless, if threshold 62 is set too low, an excessive amount of distortion may be introduced into composite signal 58.

While the same value for thresholds 62 may be used in all constrained-envelope generators 64, benefits may result from using different thresholds 62. In one embodiment, desirable results were obtained by setting the threshold 62 used in the upstream-most constrained-envelope generator 64 to a slightly higher value, and setting the thresholds 62 used in all other constrained-envelope generators 64 to a slightly lower value.

Referring to FIG. 1, the constrained-envelope, constrained-spectrum signal stream 70 generated by the downstream-most one of constrained-envelope generators 64 is passed to an input of a substantially linear amplifier 72. Substantially linear amplifier 72 produces an RF broadcast signal 74, which is then broadcast via transmitter antenna 76. In the preferred embodiment, substantially linear amplifier 72 is made up of a digital linearizer 78, a digital-to-analog converter (D/A) 80, and a radio-frequency (RF) amplifying circuit 82. Those skilled in the art will appreciate that substantially linear amplifier 72 may be realized in different embodiments than described here, and that utilization of a different embodiment does not depart from the scope of the present invention.

Within substantially linear amplifier 72, digital linearizer 78 alters constrained-envelope, constrained-spectrum signal stream 70 into a pre-distorted digital signal stream 84. Pre-distorted digital signal stream 84 is made non-linear in just the right manner to compensate for non-linearities within digital-to-analog converter 80 and RF amplifying circuit 82, hence linearizing substantially linear amplifier 72. Digital-to-analog converter 80 then converts pre-distorted digital signal stream 84 into an analog baseband signal 86. Analog baseband signal 86 is then upconverted and amplified by RF amplifying circuit 82 into RF broadcast signal 74 and transmitted via transmitter antenna 76. While FIG. 1 may suggest that broadcast signal 74 is an RF communication signal, signal 74 may alternatively be broadcast over a cable, wire pair, optical fiber, laser beam, or the like.

Figure 5:
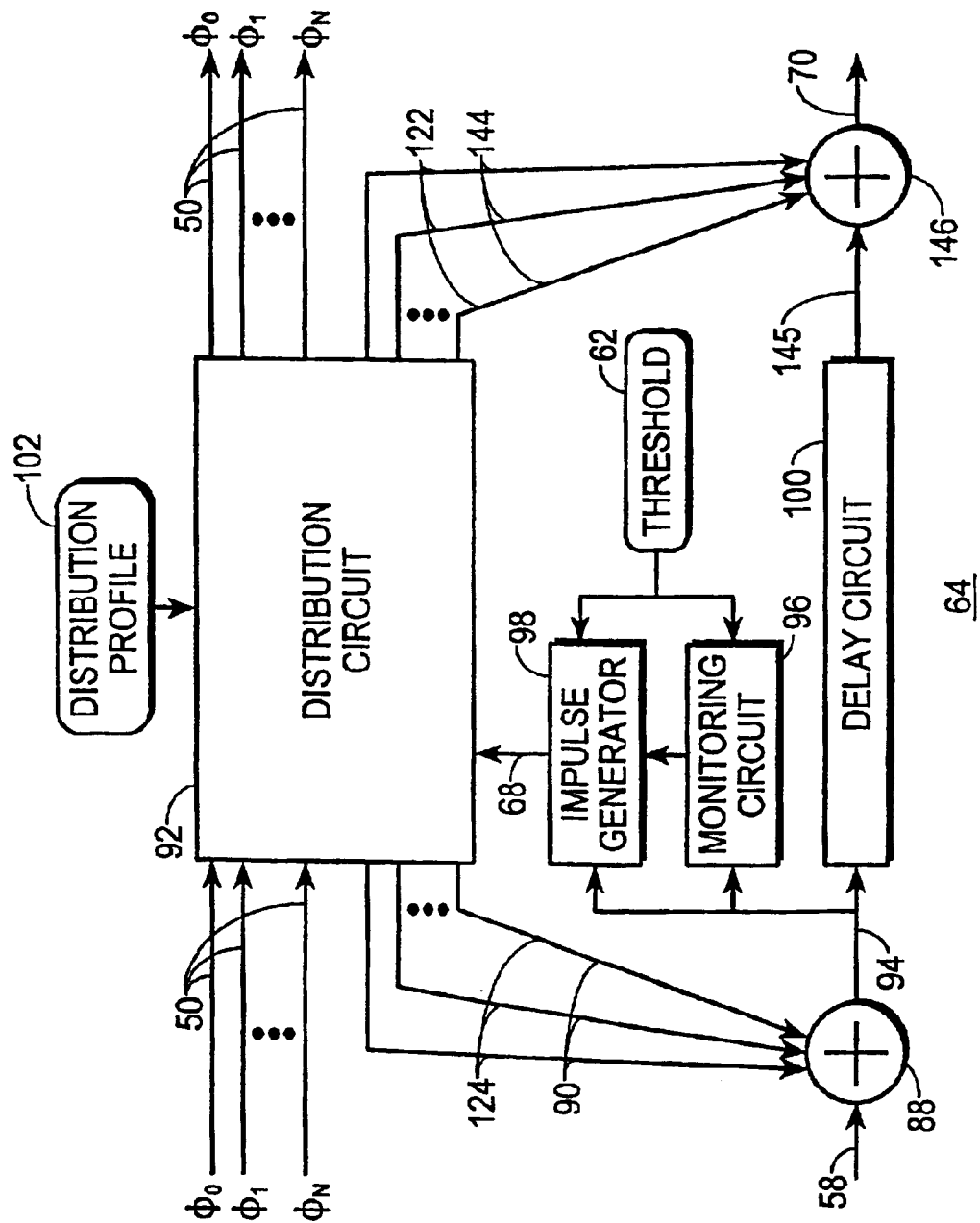
FIG. 5 shows a block diagram of a preferred constrained-envelope generator portion of the transmitter of FIG. 1.

FIG. 5 shows a block diagram of a preferred constrained-envelope generator 64. The FIG. 5 embodiment of constrained-envelope generator 64 may be used in the position of any one of the constrained-envelope generators 64 depicted in FIG. 1.

In the embodiment depicted in FIG. 5, composite signal 58 is routed to an input of a combiner 88, which sums composite signal 58 with a plurality of feedback-carrier-matched shaped pulse signals 90 generated in a distribution circuit 92. Feedback-carrier-matched shaped pulse signals 90 convey trailing portions of shaped pulses, as will be discussed in more detail below. An output of combiner 88 provides composite signal 58 in the form of an overpeak-capable signal 94 that is responsive to composite signal 58 and to all feedback-carrier-matched shaped pulse signals 90. Overpeak-capable signal 94 represents a form of composite signal 58 that has been adjusted to reflect the influence of shaped pulses added to composite signal 58 in the recent past. As a result, shaped pulses generated to compensate for future overpeak events 66 (FIG. 4) are configured to accommodate the trailing portion of other shaped pulses that may have been combined with composite signal 58 in the recent past. Overpeak-capable signal 94 is as capable of exhibiting overpeak events 66 as is composite signal 58.

Overpeak-capable signal 94 is routed to inputs of a monitoring circuit 96, an impulse generator 98, and a delay circuit 100. Other inputs of monitoring circuit 96 and impulse generator 98 are adapted to receive threshold 62. An output of monitoring circuit 96 couples to an input of impulse generator 98, and an output of impulse generator 98 couples to an input of distribution circuit 92.

Referring to FIGS. 4 and 5, monitoring circuit 96 is responsive to overpeak-capable signal stream 94 and threshold 62. Monitoring circuit 96 identifies the occurrence of overpeak events 66. This identification may take place by converting the complex samples of overpeak-capable signal stream 94 into magnitude scalars, finding local peaks from a stream of such magnitude scalars, and comparing such local peaks to threshold 62.

Desirably, overpeak events 66 are identified in time as precisely as practical. Thus, overpeak-capable signal stream 94 may desirably be provided at a data rate in excess of the minimum requirements of Shannon's sampling theory. Nothing prevents the inclusion of an interpolator (not shown) into the signal flow of overpeak-capable signal stream 94 to increase data rate using estimated sample values. Temporal precision in identifying overpeak events 66 may be obtained by requiring a magnitude scalar sample to be immediately preceded by and immediately followed by magnitude scalar samples of lesser value to be considered a local peak.

An output of monitoring circuit 96 becomes active when an overpeak event 66 is detected. Impulse generator 98 generates a corrective impulse 68 in response to the occurrence of an overpeak event 66. When no overpeak event 66 is detected, impulse generator 98 refrains from generating corrective impulse 68. Impulse generator 98 compensates for the amount by which the magnitude of overpeak-capable signal stream 94 is in excess of threshold 62. Desirably, corrective impulse 68 exhibits a magnitude equal to the difference between the magnitude of overpeak-capable signal stream 94 at overpeak event 66 and threshold 62. In addition, corrective impulse 68 desirably exhibits a phase that is 180° rotated from the phase exhibited by overpeak-capable signal stream 94 at overpeak event 66.

Additional inputs of distribution circuit 92 are adapted to receive carrier phase streams 50. In the upstream-most one of constrained-envelope generators 64, carrier phase streams 50 are provided by oscillators 52 (FIG. 1). In downstream constrained-envelope generators 64, carrier phase streams 50 are provided from corresponding outputs from an immediately upstream constrained-envelope generator 64, after being delayed therein. Another input of distribution circuit 92 receives a distribution profile 102 which is configured as a function of and is responsive to gains 44 (FIG. 1), modulation orders, and/or other modulation parameters applied to digitally modulated communication signals 14.

FIG. 6 shows a scalar diagram depicting a hypothetical distribution profile 102 for allocating a corrective impulse 68 (FIG. 4) to diverse frequency channels 54 (FIG. 1). Corrective impulse 68 desirably exhibits a total magnitude ($M_T$) that corresponds to a desired amount of reduction in the magnitude of composite signal 58 in connection with a subject overpeak event 66 (FIG. 4).

In one embodiment of the present invention, corrective impulse 68 may be equally allocated over all frequency channels 54. As an illustrative example, which is not to be viewed as imposing a limitation on the invention defined in claims set forth below, four of diverse frequency channels 54 may be generated in transmitter 10. In this example, total magnitude ($M_T$) could then be divided into four equal-allocated corrective impulses 104, but depicted as unequal magnitudes $M_0$–$M_3$ in FIG. 6, signaling desired equal amounts of reduction to be applied in each of the four frequency channels 54. Each of allocated corrective impulses 104 would desirably exhibit the same phase as corrective impulse 68.

While this embodiment achieves acceptable results in some applications, more beneficial distribution profiles 102 may be devised for other applications. In particular, when power management and other considerations have controlled gains 44 (FIG. 1) so that some frequency channels 54 have more power than other frequency channels 54, the equal-allocation embodiment discussed above will cause a relatively greater amount of distortion in the lower power frequency channels 54 than in the higher power frequency channels 54. Accordingly, a more preferred embodiment causes distribution profile 102 to be responsive to the different gains 44 applied to digitally modulated communication signals 14 (FIG. 1). Such a distribution profile 102 can lead to unequal magnitudes $M_0$–$M_3$ for allocated corrective impulses 104, as depicted in FIG. 6.

In one preferred embodiment, distribution profile 102 specifies that the allocated corrective impulse 104 for each frequency channel 54 is substantially equal to gain 44 applied in that frequency channel 54 divided by the total gain applied in all frequency channels. Thus, for a four-channel example:

$$DP_0 = g_0/(g_0+g_1+g_2+g_3);$$

$$DP_1 = g_1/(g_0+g_1+g_2+g_3);$$

$$DP_2 = g_2/(g_0+g_1+g_2+g_3);\text{ and}$$

$$DP_3 = g_3/(g_0+g_1+g_2+g_3);$$

where, $DP_0$–$DP_3$ represent scale factors corresponding to allocated corrective impulses 104 applied in each of the four channels, and $g_0$–$g_3$ represent gains 44 applied in each of the four channels.

In another preferred embodiment, distribution profile 102 compensates for different noise sensitivities of different modulation types. For example, the gain factors set forth above may be scaled upward for QPSK or other lower-order modulations and scaled downward for 64-QAM or other higher-order modulations. In this embodiment, relatively more of corrective impulse 68 may be distributed to channels which have greater noise tolerance and relatively less of corrective impulse 68 may be distributed to channels which have less noise tolerance. In variations on this embodiment, distribution profile 102 may be responsive only to modulation type or be responsive to coding strength, whether or not in combination with modulation type and/or channel gain.

Figure 7:
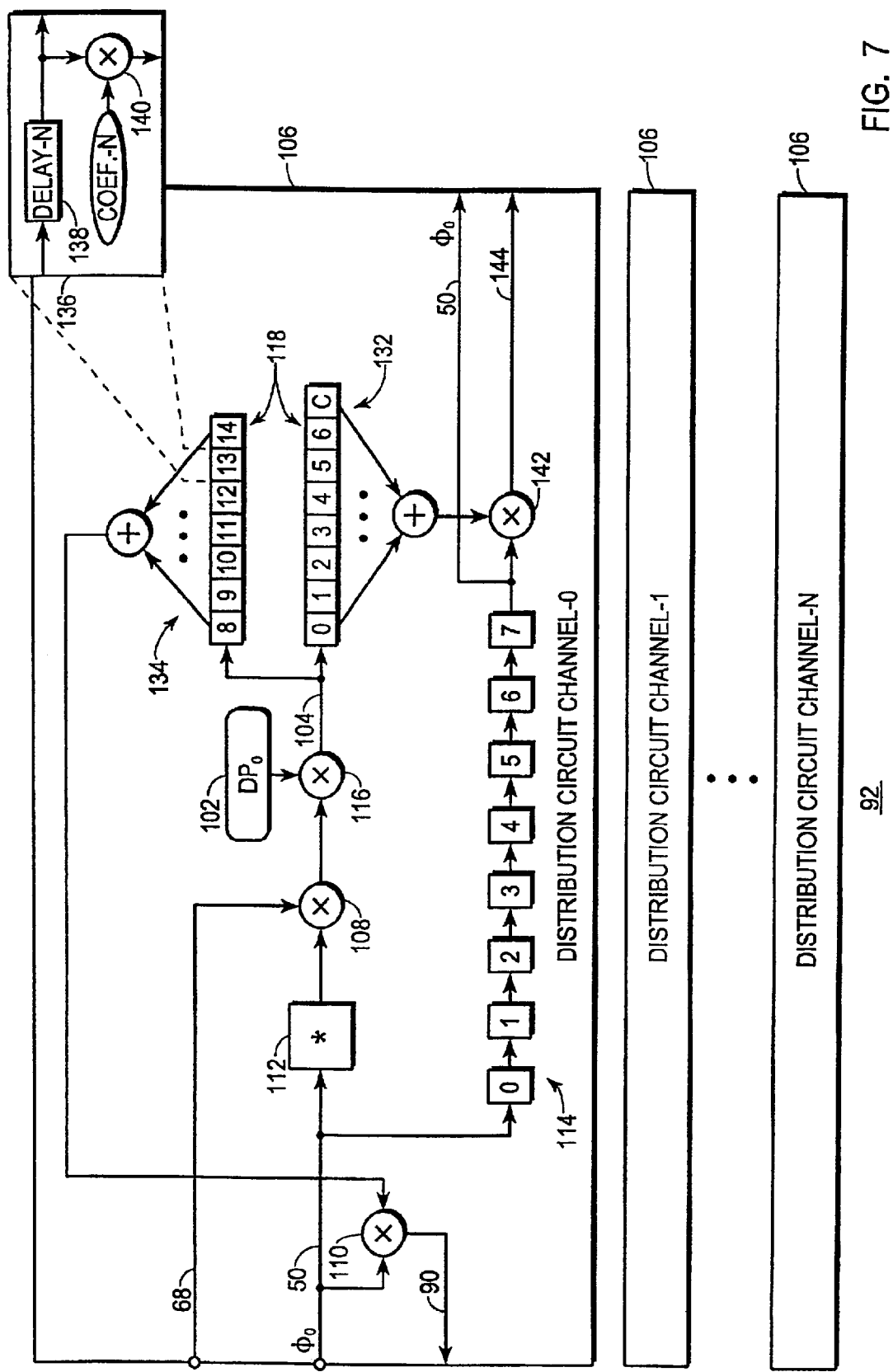
FIG. 7 shows a block diagram of a distribution circuit of the constrained-envelope generator of FIG. 5.

FIG. 7 shows a block diagram of a preferred embodiment of distribution circuit 92. Distribution circuit 92 includes a plurality of distribution circuit channels 106, labeled as "DISTRIBUTION CIRCUIT CHANNEL-0" through "DISTRIBUTION CIRCUIT CHANNEL-N" in FIG. 7. One distribution circuit channel 106 is provided for each frequency channel 54. In the preferred embodiment, distribution circuit channels 106 are substantially identical to each other. Accordingly, FIG. 7 depicts details for only one of distribution circuit channels 106. Those skilled in the art will appreciate that the discussion for this one of distribution circuit channels 106 applies to the other distribution circuit channels 106.

Corrective impulse 68 is routed to an input of a rotation circuit 108, which may be implemented as a Cordic rotator or in any other manner known to those skilled in the art. The carrier phase stream 50 that was used to generate the frequency channel 54 being processed by the subject distribution circuit channel 106 is routed to inputs of a rotation circuit 110, a conjugation circuit 112, and a delay circuit 114. An output of conjugation circuit 112 couples to another input of rotation circuit 108, and an output of rotation circuit 108 couples to a first input of a scaling circuit 116. A second input of scaling circuit 116 is adapted to receive a distribution profile signal 102 that specifies the relative amount of corrective impulse 68 to be allocated in the frequency channel 54 of interest. An output of scaling circuit 116 generates allocated corrective impulse 104, discussed above.

In an alternate embodiment, the positions of scaling circuit 116 and rotation circuit 108 may be swapped.

Allocated corrective impulse 104 passes to a segmented pulse-shaping filtering circuit 118. Filtering circuit 118 generates an allocated shaped pulse for each allocated corrective impulse 104. An allocated shaped pulse for each frequency channel 54 is later added to composite signal 58 to constrain the envelope of composite signal 58 without causing significant spectral regrowth.

FIG. 8 shows an exemplary allocated shaped pulse 120 having a leading portion 122 and a trailing portion 124 and extending for a predetermined duration. The allocated shaped pulse 120 depicted in FIG. 8 represents a Nyquist-type pulse, which is acceptable for APSK and CDMA modulations. However, other types of shaped pulses, such as Gaussian pulses and others, may be used as well. Nothing requires all allocated shaped pulses 120 in all distribution circuit channels 106 to have the same shape or to extend for the same duration. Desirably, allocated shaped pulses 120 are symmetrical in time to minimize spectral regrowth. Moreover, allocated shaped pulses 120 desirably begin at a near zero value 126 at the beginning of each leading portion 122, then build to a peak value 128 in the central region of each allocated shaped pulse 120, and diminish from peak value 128 to a near zero value 130 at the end of trailing portions 124. The magnitudes of peaks 128 are responsive to, and preferably equal to, the magnitudes of the allocated corrective impulses 104 that command their creation.

Referring to FIGS. 7 and 8, segmented pulse-shaping filtering circuit 118 filters allocated corrective impulse 104 to generate allocated shaped pulse 120. As depicted in FIG. 8, allocated shaped pulse 120 extends both into the future and the past from the overpeak event 66 that caused its generation. However, pulse-shaping filtering circuit 118 is segmented to separately generate leading portion 122 and trailing portion 124 of allocated shaped pulse 120.

Referring to FIGS. 7 and 9, FIG. 9 shows concurrently-generated leading and trailing portions 122 and 124 of allocated shaped pulse 120, as generated by segmented pulse-shaping filtering circuit 118. Segmented pulse-shaping filtering circuit 118 includes a leading filter 132 and a trailing filter 134. Each of filters 132 and 134 is a FIR filter in the preferred embodiments. FIG. 7 depicts leading filter 132 as having cells, or taps, 0–7, with the seventh tap being designated "C" for center, and trailing filter 134 as having cells 8–14. Each cell may have the form represented by cell 136. In particular, each cell 136 may have an input signal fed to a delay element 138, and delay element 138 may have an output which serves as an output of the cell 136, to be used as the input to the next cell 136. The output of delay element 138 may drive a multiplier 140, and multiplier 140 may have an input that receives a coefficient dedicated to that cell 136. The output of the multiplier 140 is output from the cell 136 and such outputs from all cells 136 are summed together to provide the filter output.

In the preferred embodiments, approximately one-half of allocated shaped pulse 120 is generated in each of filters 132 and 134. In order to have allocated shaped pulse 120 be as symmetrical in time as possible, it is desirable to have an odd number of cells 136 in segmented pulse-shaping filtering circuit 118. Consequently, allocated shaped pulse 120 cannot be precisely divided in half. The longer half of allocated shaped pulse 120, including peak 128, is generated in leading filter 132, and the shorter half of allocated shaped pulse 120, excluding peak 128, is generated in trailing filter 134. The coefficients used in leading and trailing filters 132 and 134 may correspond to coefficients used in pulse-shaping filters 42 (FIG. 1), with approximately the first ½ of the coefficients used in leading filter 132 and approximately the last ½ of the coefficients used in trailing filter 134. While FIG. 7 illustrates segmented pulse-shaping filtering circuit 118 as having 15 cells (0—4), those skilled in the art will appreciate that this precise number is used for illustrative purposes only, and that the present invention contemplates the use of any number of cells that may be suitable for a given application.

The output of trailing filter 134 is fed back to an input of rotation circuit 110. An output of rotation circuit 110 provides a feedback-carrier-matched shaped pulse signal 90 that is routed to combining circuit 88 (FIG. 5). The output of leading filter 132 couples to a first input of a rotation circuit 142, and the output of delay circuit 114 couples to a second input of rotation circuit 142. An output of rotation circuit 142 provides a carrier-matched shaped pulse signal 144 output for this distribution circuit channel 106 of distribution circuit 92. The output of delay circuit 114 provides the delayed version of carrier phase stream 50 that is output from this distribution circuit channel 106 of distribution circuit 92.

Referring to FIGS. 5 and 7, allocated shaped pulses 120 from all distribution circuit channels 106 collectively convey the desired total magnitude and phase of corrective impulse 68 but are spectrally constrained. Further, the allocated shaped pulses 120 are coherently converted into allocated carrier-matched shaped pulse signals 144 for the respective frequency channels 54. Trailing portions 124 of these allocated shaped pulses 120 are combined with composite signal 58 at combiner 88 and leading portions 122 of these allocated shaped pulses 120 are combined with a delayed composite signal 145 at a combiner 146. Delayed composite signal 145 represents overpeak capable signal 94 after delay in delay circuit 100. Combiner 146 generates constrained-envelope, constrained-spectrum signal stream 70 output from constrained-envelope generator 64.

Delay circuit 100 delays overpeak-capable signal stream 94 by approximately ½ of the duration of each allocated shaped pulse 120. In particular, delay circuit 100 imposes a delay of sufficient duration so that the portion of overpeak-capable signal stream 94 that was identified as an overpeak event 66 in monitoring circuit 96 is output from delay circuit 100 when each allocated corrective impulse 104 has progressed through leading filters 132 to the last cell 136 (i.e., the cell labeled "C" in FIG. 7) of each leading filter 132. That way, the bulk of the leading portions 122 (FIGS. 8–9) of each allocated shaped pulse 120 is added to overpeak-capable signal stream 94 prior to the occurrence of overpeak event 66 in overpeak-capable signal stream 94, and peaks 128 (FIGS. 8–9) of each allocated shaped pulse 120 coincide with overpeak event 66 in overpeak-capable signal stream 94.

Since trailing portions 124 of allocated shaped pulses 120 were generated early, concurrently with leading portions 122, and added to composite signal 58 at combining circuit 88 prior to delaying in delay circuit 100, the trailing portions 124 of allocated shaped pulses 120 have already been combined with composite signal 58 and will exit combining circuit 146 immediately following overpeak event 66. Since allocated corrective impulses 104 pass through respective leading filters 132 to their last cells 136 at overpeak event 66, leading filters 132 will exert no further influence on composite signal 58 after overpeak event 66 arrives at combining circuit 146.

Referring back to FIG. 7, the objective of each carrier-matched shaped pulse signal 144 is to be coherent with the frequency channel 54 into which it is being added so as not to influence the spectral characteristics of that already-modulated frequency channel when combined at combining circuit 146 (FIG. 5). Accordingly, rotation circuits 108, 142, and 110 are provided to address this objective. Rotation circuits 142 and 110 duplicate the function as mixer 48 (FIG. 1) using the same carrier, but operating respectively on leading and trailing portions 122 and 124 of allocated shaped pulse 120 (FIGS. 8–9). Delays are established in delay circuit 114 and segmented filtering circuit 118 so that rotation circuits 142 and 110 process the same carrier phase values for the same instants of composite signal 58. Conjugation circuit 112 and rotation circuit 108 collectively rotate by a negative phase value to offset the rotation applied in mixer 48 for the respective frequency channel 54. Accordingly, when rotation circuits 142 and 110 rotate allocated shaped pulses 120 in the same manner as that applied by mixers 48, the result is a carrier phase match in carrier-matched shaped pulse signals 144 and feedback-carrier-matched shaped pulse signals 90.

Referring to FIGS. 4–9, segmenting the allocated shaped pulses 120 into leading and trailing portions 122 and 124 is one preferred embodiment, but other preferred embodiments may omit this feature. This feature is desirable because the influence of the trailing portions of each shaped pulse 120 on composite signal 58 is accounted for in the configuration of future shaped pulses.

In other embodiments, filtering circuit 118 may be implemented as a pulse-shaping filter having a single output that provides the entirety of a shaped pulse in the proper temporal order, and being combined with composite signal 58 at combining circuit 146. In such embodiments, combining circuit 88 may be omitted. When the use of a segmented filtering circuit 118 is omitted, the cascading of constrained-envelope generators 64 (FIG. 1) will nevertheless compensate for overpeak events caused by the influence of allocated shaped pulses 120 upon composite signal 58 for a limited number of unit intervals in the future and past relative to each overpeak event 66.

In summary, the present invention provides an improved digital communications transmitter with constrained envelope and constrained spectral regrowth over a plurality of carriers. A constrained-envelope digital communications transmitter and method are provided to generate signals which, when combined with a composite signal made from a plurality of digitally modulated communication signals, each of which occupies a predetermined bandwidth, reduce peak-to-average power ratio in the composite signal without significantly increasing the bandwidths, either individually or collectively. A modulated signal which includes a plurality of diverse frequency channels, or carriers, and exhibits a desired bandwidth but an undesirably large peak-to-average power ratio is adjusted to lessen the peak-to-average power ratio without significantly increasing bandwidth. Spectrally constrained corrective pulses are added to a multi-carrier modulated signal in a manner that minimizes growth in peak-to-average power ratio caused by the corrective pulses. In one embodiment, at least two constrained-envelope generators are coupled in series so that a downstream constrained-envelope generator can compensate for peak-to-average power ratio growth caused by an upstream constrained-envelope generator. A spectrally desirable corrective shaped pulse is allocated to diverse frequency channels in a manner that desirably distributes the distortion resulting from the corrective shaped pulse over the diverse channels.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A digital communications transmitter with constrained envelope and constrained spectral regrowth over a plurality of carriers, said transmitter comprising:

a combiner for forming a composite signal from a plurality of diverse frequency channels, wherein said diverse frequency channels are configured to convey a plurality of digitally modulated communication signals;

a monitoring circuit coupled to said combiner and configured to detect overpeak events by determining when an overpeak-capable signal responsive to said composite signal exceeds a threshold;

an impulse generator coupled to said monitoring circuit for generating a corrective impulse configured to compensate for an amount by which said overpeak-capable signal is in excess of said threshold; and a distribution circuit, coupled to said impulse generator for distributing portions of said corrective impulse to said diverse frequency channels.

2. A digital communications transmitter as claimed in claim 1 additionally comprising:

a plurality of pulse-shaping filters; and a plurality of mixers coupled to said plurality of pulse-shaping filters, wherein said plurality of mixers produce said plurality of diverse frequency channels.

3. A digital communications transmitter as claimed in claim 1 wherein:

each of said digitally modulated communication signals conveys a predetermined amount of data per unit interval; and said composite signal is a complex signal providing complex samples at a rate greater than or equal to two times the number of frequency channels per unit interval.

4. A digital communications transmitter as claimed in claim 1 wherein:

said monitoring circuit, said impulse generator, and said distribution circuit are included in a first constrained-envelope generator; and said digital communications transmitter additionally comprises a second constrained-envelope generator coupled in series with said first constrained envelope generator.

5. A digital communications transmitter as claimed in claim 1 wherein said digitally modulated communication signals are configured to exhibit one or more of CDMA, APSK, and GMSK modulations.

6. A digital communications transmitter as claimed in claim 1 wherein said distribution circuit receives signals responsive to gains applied in said frequency channels.

7. A digital communications transmitter as claimed in claim 6 wherein said distribution circuit is configured so that one of said portions of said corrective impulse distributed to one of said frequency channels is substantially equal to gain applied in said one frequency channel divided by total gain applied in all frequency channels.

8. A digital communications transmitter as claimed in claim 1 wherein said distribution circuit receives a signal responsive to modulation types applied in said frequency channels.

9. A digital communications transmitter as claimed in claim 1 wherein said distribution circuit comprises, for one of said plurality of frequency channels:

a first rotation circuit;

a scaling circuit coupled to said first rotation circuit;

a filtering circuit coupled to one of said scaling circuit and said first rotation circuit and configured to generate a shaped pulse having a predetermined duration; and a second rotation circuit coupled to said filtering circuit and configured to generate a carrier-matched shaped pulse.

10. A digital communications transmitter as claimed in claim 9 wherein said transmitter additionally comprises:

a delay circuit for delaying said composite signal by at least one-half of said predetermined duration to produce a delayed composite signal; and a combining circuit for combining said delayed composite signal with said carrier-matched shaped pulse.

11. A digital communications transmitter as claimed in claim 9 wherein said first rotation circuit is adapted to receive at least one of said portions of said corrective impulse and is adapted to receive a carrier phase stream, said carrier phase stream describing an oscillating signal used in forming one of said plurality of diverse frequency channels.

12. A digital communications transmitter as claimed in claim 11 wherein said first rotation circuit includes a conjugation circuit configured to determine conjugates of phase values defined by said carrier phase stream.

13. A digital communications transmitter as claimed in claim 9 wherein:

said first rotation circuit is adapted to receive at least one of said portions of said corrective impulse and is adapted to receive a carrier phase stream, said carrier phase stream describing an oscillating signal used in forming one of said plurality of diverse frequency channels;

said distribution circuit further comprises a delay circuit configured to delay said carrier phase stream and produce a delayed carrier phase stream; and said second rotation circuit is adapted to receive said shaped pulse and is adapted to receive said delayed carrier phase stream.

14. A digital communications transmitter as claimed in claim 13 wherein said delay circuit delays said phase stream by at least one-half of said predetermined duration.

15. A digital communications transmitter as claimed in claim 9 wherein said filtering circuit comprises a segmented pulse shaping filter having a first output for providing a leading portion of said shaped pulse and having a second output for providing a trailing portion of said shaped pulse, said first output being coupled to said second rotation circuit.

16. A digital communications transmitter as claimed in claim 15 wherein said second output of said segmented pulse shaping filter couples to a third rotation circuit configured to generate a feedback-carrier-matched shaped pulse, said feedback-carrier-matched shaped pulse being routed to said combiner so that said overpeak-capable signal is responsive to said trailing portion of said shaped pulse.

17. A method of operating a digital communications transmitter to constrain envelope and spectral regrowth while processing a plurality of communication signals, said method comprising:

generating a plurality of digitally modulated communication signals;

converting said plurality of digitally modulated communication signals into diverse frequency channels;

combining said diverse frequency channels to form a composite signal;

detecting overpeak events by determining when an overpeak-capable signal responsive to said composite signal exceeds a threshold;

generating a corrective impulse configured to compensate for an amount by which said overpeak-capable signal is in excess of said threshold; and distributing portions of said corrective impulse to said diverse frequency channels.

18. A method as claimed in claim 17 wherein:

said distributing activity generates a plurality of allocated shaped pulses in said diverse frequency channels; and said method additionally comprises adding said plurality of allocated shaped pulses in said diverse frequency channels with said composite signal.

19. A method as claimed in claim 18 wherein:

said allocated shaped pulses exhibit a predetermined duration;

said method additionally comprises delaying said composite signal by at least one-half of said predetermined duration to generate a delayed composite signal; and said adding activity adds said plurality of allocated shaped pulses in said diverse frequency channels with said delayed composite signal.

20. A method as claimed in claim 17 additionally comprising refraining from generating said corrective impulse when no overpeak event is detected.

21. A method as claimed in claim 17 wherein said portions of said corrective impulse are distributed in accordance with a distribution profile responsive to gains applied to said digitally modulated communication signals.

22. A method as claimed in claim 21 wherein one of said portions of said corrective impulse distributed to one of said frequency channels is substantially equal to gain applied in said one frequency channel divided by total gain applied in all frequency channels.

23. A method as claimed in claim 17 wherein said converting activity uses a plurality of carrier phase streams to convert said digitally modulated communication signals into said diverse frequency channels, and said distributing activity comprises:

rotating and scaling one of said portions of said corrective impulse by one of said carrier phase streams to produce an allocated corrective impulse;

filtering said allocated corrective impulse to form an allocated shaped pulse; and converting said allocated shaped pulse to one of said diverse frequency channels.

24. A method as claimed in claim 23 wherein:

said method additionally comprises delaying said one of said carrier phase streams to produce a delayed carrier phase stream; and said converting activity converts said allocated shaped pulse to said one of said diverse frequency channels using said delayed carrier phase stream.

25. A method as claimed in claim 24 wherein:

said allocated shaped pulse exhibits a predetermined duration; and said delaying activity delays said phase stream by at least one-half of said predetermined duration.

26. A method as claimed in claim 23 wherein said method additionally comprises delaying said composite signal to produce a delayed composite signal, and said filtering activity comprises:

generating a leading portion of said shaped pulse;

combining said leading portion of said shaped pulse with said delayed composite signal;

generating a trailing portion of said shaped pulse; and combining said trailing portion of said shaped pulse with said composite signal so that said detecting activity is responsive to said trailing portion of said shaped pulse.

27. A digital communications transmitter with constrained envelope and constrained spectral regrowth over a plurality of carriers, said transmitter comprising:

a plurality of mixers which convert a plurality of digitally modulated communication signals to a plurality of diverse frequency channels using a plurality of carrier phase streams;

a first combiner for forming a composite signal from said plurality of diverse frequency channels;

a distribution circuit having inputs responsive to said composite signal and said carrier phase streams, said distribution circuit being configured to generate allocated corrective impulses that compensate for overpeak events in said composite signal, filter said allocated corrective impulses into shaped pulses having a predetermined duration, and convert said shaped pulses into said diverse frequency channels;

a delay circuit for delaying said composite signal by at least one-half of said predetermined duration; and a second combiner for combining said delayed composite signal with said shaped pulses converted into said diverse frequency channels.

28. A digital communications transmitter as claimed in claim 27 wherein said distribution circuit comprises a scaling circuit which receives signals responsive to gains applied in said frequency channels and generates said allocated corrective impulses in accordance with a distribution profile responsive to said gains.

29. A digital communications transmitter as claimed in claim 27 wherein said distribution circuit is configured so that said shaped pulses are converted into said diverse frequency channels so as to be coherent with said composite signal.

* * * * *